United States Patent [19]
Lee et al.

[11] Patent Number: 6,108,156
[45] Date of Patent: Aug. 22, 2000

[54] METHOD FOR RECORDING A PORT NUMBER OF A SERVO TRACK WRITER

[75] Inventors: Jae-Sung Lee, Seoul; Duck-Jun Cha, Gumi, both of Rep. of Korea

[73] Assignee: Samsung Electronics Co., Ltd., Suwon, Rep. of Korea

[21] Appl. No.: 09/084,588

[22] Filed: May 27, 1998

[30] Foreign Application Priority Data

May 27, 1997 [KR] Rep. of Korea .................... 97-20929

[51] Int. Cl.⁷ .................................................. G11B 21/02
[52] U.S. Cl. ............................ 360/75; 360/55; 360/69; 702/81; 700/108; 700/109
[58] Field of Search ................. 360/75, 55, 69, 360/31; 700/108, 109; 702/81, 84

[56] References Cited

U.S. PATENT DOCUMENTS

| | | |
|---|---|---|
| 4,280,136 | 7/1981 | Kashima et al. ................... 348/86 |
| 5,272,578 | 12/1993 | Diau . |
| 5,333,140 | 7/1994 | Moraru et al. ..................... 714/719 |
| 5,381,281 | 1/1995 | Shrinkle et al. . |
| 5,390,324 | 2/1995 | Burchhartt et al. . |
| 5,500,848 | 3/1996 | Best et al. . |
| 5,519,546 | 5/1996 | Lewis . |
| 5,566,339 | 10/1996 | Perholtz et al. . |
| 5,581,606 | 12/1996 | Gineys . |
| 5,596,711 | 1/1997 | Burckhartt et al. . |
| 5,619,387 | 4/1997 | Ottesen et al. . |
| 5,706,145 | 1/1998 | Hindman et al. . |
| 5,710,677 | 1/1998 | Teng et al. . |
| 5,715,105 | 2/1998 | Katayama et al. . |
| 5,719,721 | 2/1998 | Iizuka et al. . |
| 5,745,453 | 4/1998 | Ikeda . |

*Primary Examiner*—Paul Loomis
*Assistant Examiner*—Dan I. Davidson
*Attorney, Agent, or Firm*—Robert E. Bushnell, Esq.

[57] ABSTRACT

A method for recording the port number of a servo track writer for efficiently managing a manufacturing process of a magnetic storage device. In a manufacturing process of a hard disk drive having a disk as a recording medium, the disk including a data band for recording user data and a plurality of protection bands, the port number of a servo track writer is recorded in at least one of the bands during servo information writing in the method, so that the port number can be read and used for the manufacturing process.

22 Claims, 5 Drawing Sheets

FIG. 3A

| SERVO SECTOR | DATA SECTOR | SERVO SECTOR | DATA SECTOR |

FIG. 3B

| AGC | SYNC | SAM | IDX | GRAY CODE | SERVO BURST (A,B,C,D) | PAD |

FIG. 3C

| AGC | SYNC | SAM | IDX | SECTOR NUMBER | HEAD NUMBER | CYLINDER NUMBER | SERVO BURST (A,B,C,D) | PAD |

FIG. 3D

| ID | DR |

METHOD FOR RECORDING A PORT NUMBER OF A SERVO TRACK WRITER

CLAIM OF PRIORITY

This application makes reference to, incorporates the same herein, and claims all benefits accruing under 35 U.S.C. §119 from an application for METHOD FOR RECORDING PORT NUMBER OF SERVO TRACK WRITER earlier filed in the Korean Industrial Property Office on the May 27, 1997 and there duly assigned Ser. No. 20929/1997.

BACKGROUND OF THE INVENTION

1. Field of Invention

The present invention relates to servo track writing for a magnetic storage device, and in particular, to a method for recording the port number of a servo track writer on a predetermined area of a disk surface for efficient management of a manufacturing process of a magnetic storage device.

2. Description of the Related Art

Magnetic storage devices such as a hard disk drive and a floppy disk drive are widely used as auxiliary memory devices for a computer system. In particular, the hard disk drive has the advantages of stable storage of massive data and high-speed data access.

U.S. Pat. No. 5,272,578 to Diau entitled Method For Writing A Uniform Servo Code Into A Magnetic Disk Drive discloses a method for writing a final track positioning servo code into a servo code signal region of a set of disks of a magnetic disk drive. U.S. Pat. No. 5,381,281 to Shrinkle et al. entitled Disk Drive System Using Multiple Embedded Quadrature Servo Fields disclose a quadrature based embedded servo control system wherein each data sector includes a gray code field spanning the entire width of the data track and a quad-servo burst pattern having first, second, third, and fourth servo burst fields distributed along the length of a portion of the data sector, with the center point of the first, second, third, and fourth servo bursts being sequentially offset from the adjacent burst by a radial distance equivalent to one-half of the data track width. It is further disclosed that a second gray code field extending substantially the width of the data track and a second quad-servo burst pattern substantially identical to the first is provided near a mid-point in the data portion of the data sector. A servo pattern is disclosed for providing servo information for the positioning of a head with respect to concentric data tracks provided on the surface of a data storage media, wherein each data track includes a series of data sectors, with the servo pattern including a plurality of servo burst fields provided in each data sector and in a series ordered along the length of each data sector.

U.S. Pat. No. 5,390,324 to Burckhartt et al. entitled Computer Failure Recovery And Alert System disclose a computer system including a timer which times out if the operating system of the computer system does not periodically reset the timer. It is disclosed the computer performs its power on program and checks the memory array for bad memory blocks, which are mapped out of the memory, with the computer system alerting the operator of the failure using a pager. U.S. Pat. No. 5,500,848 to Best et al. entitled Sector, Servo Data Recording Disk Having Data Regions Without Identification (ID) Fields disclose a data recording disk file with a fixed block architecture sector format that eliminates the ID region. It is disclosed the servo region contains sector identification information in the form of a start-of-track indicating mark recorded in a selected sector of each track and a start-of-sector indicating mark recorded in each sector, with a full track number identifier being encoded in the position field within the servo region of each sector. It is disclosed a look-up table is built at format time to map bad sectors out of the disk file. U.S. Pat. No. 5,519,546 to Lewis entitled Apparatus For, And Methods Of, Recording Signals In Tracks On A Memory Member Without Using Reference Indices Such As Clock Signals discloses a head records a track (e.g. a servo track) in a memory member outside of a clean room without using reference indices, wherein in each of a plurality of cyclical movements (e.g. revolutions), signals (e.g. servo signals) are recorded in the track in an individual number of frames. It is disclosed that sectors and data sectors following the sectors are recorded with signals in progressive cyclical movements in an embodiment.

U.S. Pat. No. 5,566,339 to Perholtz et al. entitled System And Method For Monitoring Computer Environment And Operation disclose an advanced electronic alert system for monitoring computer network(s), environment, security and the status of tasks being processed by a computer. A mass storage device associated with a computer is disclosed with data interface means connected to control means and the computer for connecting a monitoring apparatus to the computer to transfer data between the monitoring apparatus and the mass storage device associated with the computer in response to signals received from the control means.

U.S. Pat. No. 5, 581,606 to Gineys entitled Data Storage Back-Up And Modem Apparatus discloses a streamer apparatus for transferring data between a first storage device of a computer system, which has serial interface transmit and receive ports for transmitting and receiving data and a digital audio storage device, which has audio input and output lines. U.S. Pat. No. 5,596,711 to Burckhartt et al. entitled Computer Failure Recovery And Alert System disclose a computer system which includes a timer which times out if the operating system of the computer system does not periodically reset the timer. It is disclosed the computer system performs its power on program and checks the memory array for bad memory blocks, which are mapped out of the memory. It is also disclosed the computer system alerts the operator of the failure using a pager.

U.S. Pat. No. 5,619,387 to Ottesen et al. entitled Disk Storage Device With Spiral Data Track And Incremental Error Offsets In Angularly Spaced Imbedded Concentric Servo Patterns disclose a disk drive which stores multimedia data in long spiral data tracks, wherein the tracks on opposite surfaces of the disk spiral in opposite directions, so that a track on one surface can be read as the actuator sweeps in, and a track on the opposite surface can be read as the actuator sweeps out. Servo sectors are disclosed as written to the disk in a conventional concentric manner, rather than using a spiral pattern wherein, when writing servo sectors, a circular track of sectors is written around the disk, and at an index position the servo writer increments its location by one track width to write the next circular track concentric with the first, successively writing servo tracks in this manner until the disk surface is completely traversed. U.S. Pat. No. 5,706,145 to Hindman et al. entitled Apparatus And Methods For Audio Tape Indexing With Data Signals Recorded In The Guard Band disclose apparatus and methods for providing an indexed audio tape, wherein the method includes the step of recording data in a guard band interposed between and parallel to two signal tracks used to record audio signals on an audio tape.

U.S. Pat. No. 5,710,677 to Teng et al. entitled Method of Detecting And Isolating Defective Servo Bursts disclose a method to determine a defective servo burst written on a recording medium having a plurality of tracks, each track containing a plurality of position data portions, wherein the position data portions include servo bursts capable of providing position error information, which can be selectively retrieved by a servo control system having a servo gate enabling signal. U.S. Pat. No. 5,715,105 to Katayama et al. entitled Method Of And Apparatus For Recording On And Reproducing From Disk-Type Recording Medium Having Recording Tracks With Sectors Each Having An ID Area And A Data Area disclose a magnetic disk recording and reproducing apparatus including a unit for inserting an error correcting code relating to control information in the control information, the control information relating to data, a recording control unit for recording the control information and the data in a recording area of a magnetic disk, the recording area having a plurality of sectors. It is disclosed that each of the sectors having an ID area for recording the control information and a data area for recording the data, the data area corresponding to the ID area and being provided adjacent to and behind the ID area in the same sector as the ID area, and an error correcting unit for correcting errors in the control information in the ID area using the error correcting code before the data in the data area corresponding to the ID area and provided in the same sector as the ID area is read or recorded.

U.S. Pat. No. 5,719,721 to Iizuka et al. entitled Method And Apparatus For Recording Track Numbers In A Standard Recording Mode And A Long Time Recording Mode disclose that when a ratio of track pitches in an SP mode and an LP mode is equal to 3:2 the track number is recorded onto each track by advancing the track number one by one in the SP mode and the track number is advanced by setting the even or odd track numbers as a same track number in two tracks and is recorded onto each track in the LP mode. It is disclosed that even when a new recording is performed onto a recorded tape, the track numbers are continuous, so that the track number can be used for detecting the absolute address. U.S. Pat. No. 5,745,453 to Ikeda entitled Disk, Recording Device, Reproducing Device, Recording Method And Reproducing Method Including Calculation, Storage And Utilization of Parity Information discloses a disk for recording specified data having a plurality of helically formed track areas with one round of the circumferential direction of the disk as one track and a plurality of sector areas in which the plurality of track areas given track numbers added continuously from the outer peripheral direction of the disk are dividedly formed. It is disclosed that the plurality of sector areas include a plurality of data areas for storing the specified data and one parity sector for storing the parity of the specified data stored therein, wherein the plurality of sector areas are given sector numbers added continuously from the starting positions of the track areas. It is disclosed that in an information recording block having the plurality of sector areas included in the specified number of ones of the plurality of track areas, a plurality of parities recorded in the parity sector areas of these track areas are calculated by using different track and sector numbers.

In general, a hard disk drive includes a disk for rapidly rotating by an internal spindle motor, and an actuator arm having a magnetic head for recording or reading data on or from a track of the disk. The actuator arm, installed to rotate around a pivot shaft, has a bobbin and a coil in an end portion thereof. The bobbin and the coil are moved by operation of a voice coil motor, and the magnetic head attached at the tip of a suspension in the other end portion of the actuator arm moves between both ends of the disk, to record or read data on or from a track of the disk. The magnetic head moves over the disk at a very small levitation height due to an air flow generated by high-speed rotation of the disk.

Further, in a disk assembly, having bands on the disk installed around a driving shaft of the spindle motor, the disk is divided into a parking zone where the head is positioned when the drive is not used, that is, when the power is off, a data band where data is recorded, an outer guard band, and an inner guard band. In order to write and read data on and from the data band, a servo control is required to move the magnetic head to a target track and make the magnetic head follow a center line of the target track within a predetermined range. For servo control in a hard disk drive, servo information should be recorded on the disk. The servo information is generally recorded on the disk by a servo track writer during a manufacturing process of the hard disk drive.

Sector formats for tracks are concentrically arranged in the data band of the disk. A servo sector and a data sector are alternately arranged in a track. The data sector is divided into a data identification region (absent in a headerless format) for recording data identification information, and a data region for recording user data. The servo sector is divided into auto gain control, servo synchronization signal, servo address mark, index, gray code, servo burst (A, B, C, and D), and PAD regions. The auto gain control keeps the time required for shifting the magnetic head from a data writing state to a servo information reading state and the magnitude of a position signal read by the magnetic head constant all over the disk regions. The servo synchronization signal provides synchronization for servo signal detection, the servo address mark provides reference signals for generating various servo timings, and the index provides information on one rotation of a disk. The servo bursts serve to control an on-track position of a head. In the gray code, address information such as servo sector, head, and cylinder numbers is recorded.

However, the servo sector does not reveal what servo track writer was used in a manufacturing process of a hard disk drive, though it includes many pieces of servo information. Such servo track writer information, if it is recorded along with servo information, is useful in managing the numbers of daily products, good products, and bad products. In addition, when the servo information is wrongly recorded, the servo track writer information enables a corresponding servo track writer to be easily detected, and efficiently repaired and maintained. However, since the port numbers of servo track writers are not recorded in a conventional manufacturing process of a hard disk drive, it cannot be easily determined in an failure analysis which servo track writer was used, although a port number is given to an individual servo track writer. As a result, due to the absence of servo track writer port numbers, a substantial amount of time and effort is required to detect, repair, and maintain a corresponding servo track writer when servo information is wrongly recorded during the conventional servo track writing process for a hard disk drive, and an operator manually calculates the number of daily products, good products, and bad products for process management.

SUMMARY OF THE INVENTION

An object of the present invention is to provide a method for recording the port number of a servo track writer for efficient process management. A further object of the present invention is to provide a method for recording a port number of a servo track writer for easy detection of a detective servo track writer in a failure analysis.

To achieve the above and other objects of the present invention, there is provided a method for recording the port number of a servo track writer for use in a manufacturing process of a hard disk drive having a recording medium, such as a disk. The disk preferably includes a data band for recording user data and a plurality of protection bands. In the method, the port number of a servo track writer is provided and is recorded in a predetermined area of the recording medium, such as in at least one of the data band and the protection bands, during servo information writing, and reading the port number recorded, so as to be used for the manufacturing process.

BRIEF DESCRIPTION OF THE ATTACHED DRAWINGS

A more complete appreciation of the invention, and many of the attendant advantages thereof will be readily apparent as the same becomes better understood by reference to the following detailed description when considered in conjunction with the accompanying drawings in which like reference symbols indicate the same or similar components, wherein:

FIGS. 3A–3C illustrate servo sector formats for tracks concentrically arranged in a data band of a disk;

FIG. 3D illustrates a data sector of a disk having a data identification region and a data region;

DETAILED DESCRIPTION OF PREFERRED EMBODIMENTS

Figure 1:
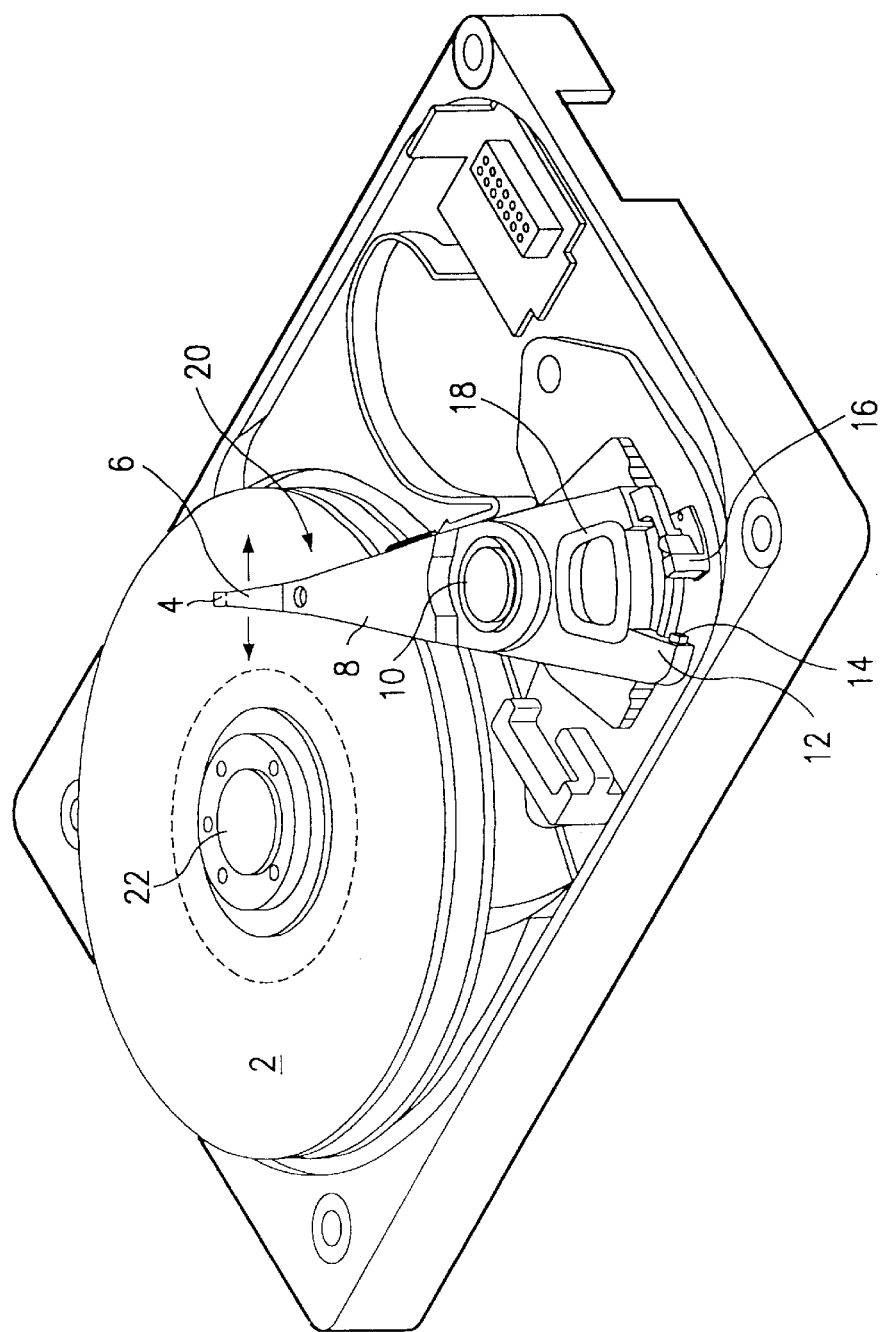
FIG. 1 is a perspective view of a hard disk drive as a magnetic storage device.

Referring to FIG. 1, in general, a hard disk drive includes a disk 2 for rapidly rotating by an internal spindle motor 22, and an actuator arm 20 having a magnetic head 4 (hereinafter, referred to as a head 4) for recording or reading data on or from a track of the disk 2, as shown in FIG. 1. The actuator arm 20, installed to rotate around a pivot shaft 10, has a bobbin 12 and a coil in an end portion thereof. The bobbin 12 and the coil are moved by operation of a voice coil motor 18, and 7 the head 4 attached at the tip of a suspension 6 in the other end portion of the actuator arm 20 moves between both ends of the disk 2, to record or read data on or from a track of the disk 2. Here, the 9 head 4 moves over the disk 2 at a very small levitation height due to an air flow generated by high-speed rotation of the disk 2.

Figure 2:
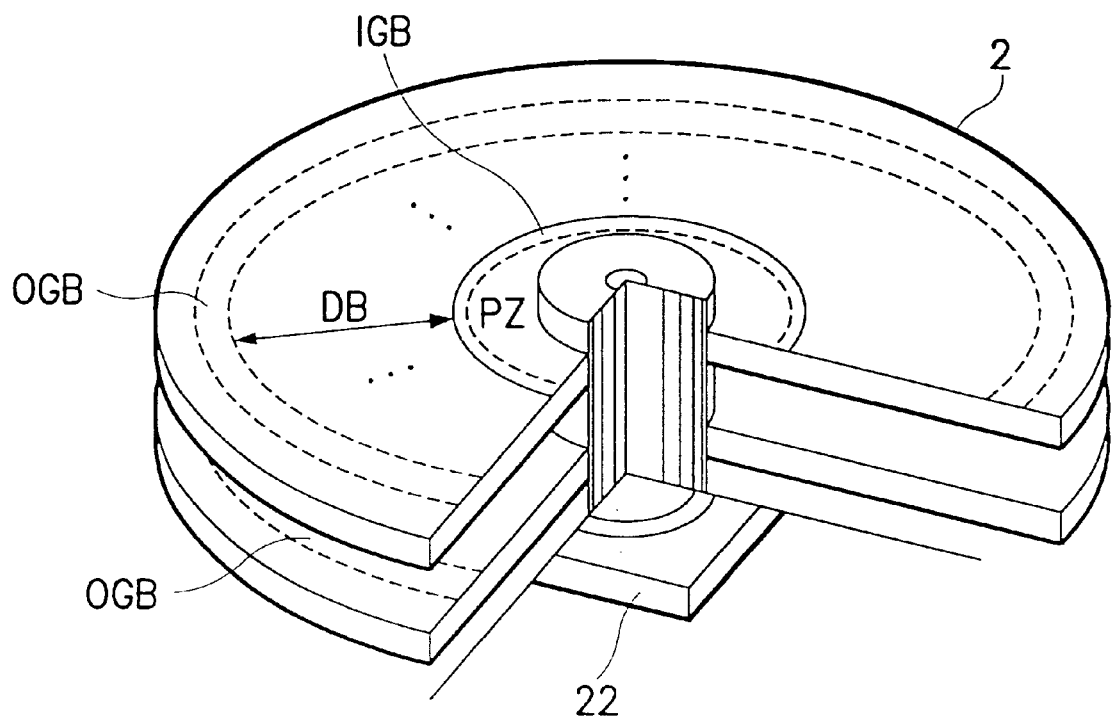
FIG. 2 is a perspective view of a disk installed around a driving shaft of a spindle motor, for showing bands of the disk.

FIG. 2 is a perspective view of a disk assembly, showing bands on the disk 2 installed around a driving shaft of the spindle motor 22. The disk 2 is divided into a parking zone PZ where the head is positioned when the drive is not used, that is, when the power is off, a data band DB where data is recorded, an outer guard or protection band OGB, and an inner guard or protection band IGB. In order to write and read data on and from the data band DB, a servo control is required to move the head 4 to a target track and make the head 4 follow a center line of the target track within a predetermined range. For servo control in a hard disk drive, servo information should be recorded on the disk 2. The servo information is generally recorded on the disk 2 by a servo track writer (STW) during a manufacturing process of the hard disk drive. Referring to FIGS. 3A–3C, the servo information will be described in detail.

FIGS. 3A–3C illustrate sector formats for tracks concentrically arranged in the data band DB of the disk 2. In FIG. 3A, a servo sector and a data sector are alternately arranged in a track. As shown in FIG. 3D, the data sector is divided into a data identification (ID) region (absent in a headerless format) for recording ID information, and a data region (DR) for recording user data. As shown in FIG. 3B, the servo sector is divided into auto gain control (AGC), servo synchronization signal (SYNC), servo address mark (SAM), index (IDX), gray code, servo burst (A, B, C, and D), and PAD regions. The AGC keeps the time required for shifting the head 4 from a data writing state to a servo information reading state and the magnitude of a position signal read by the head 4 9 constant all over the disk regions. The SYNC provides synchronization for servo signal detection, the SAM provides reference signals for generating various servo timings, and the IDX provides information on one rotation of a disk. The servo bursts serve to control an on-track position of a head. In the gray code, address information such as servo sector, head, and cylinder numbers is recorded, as shown in FIG. 3C.

Figure 4:
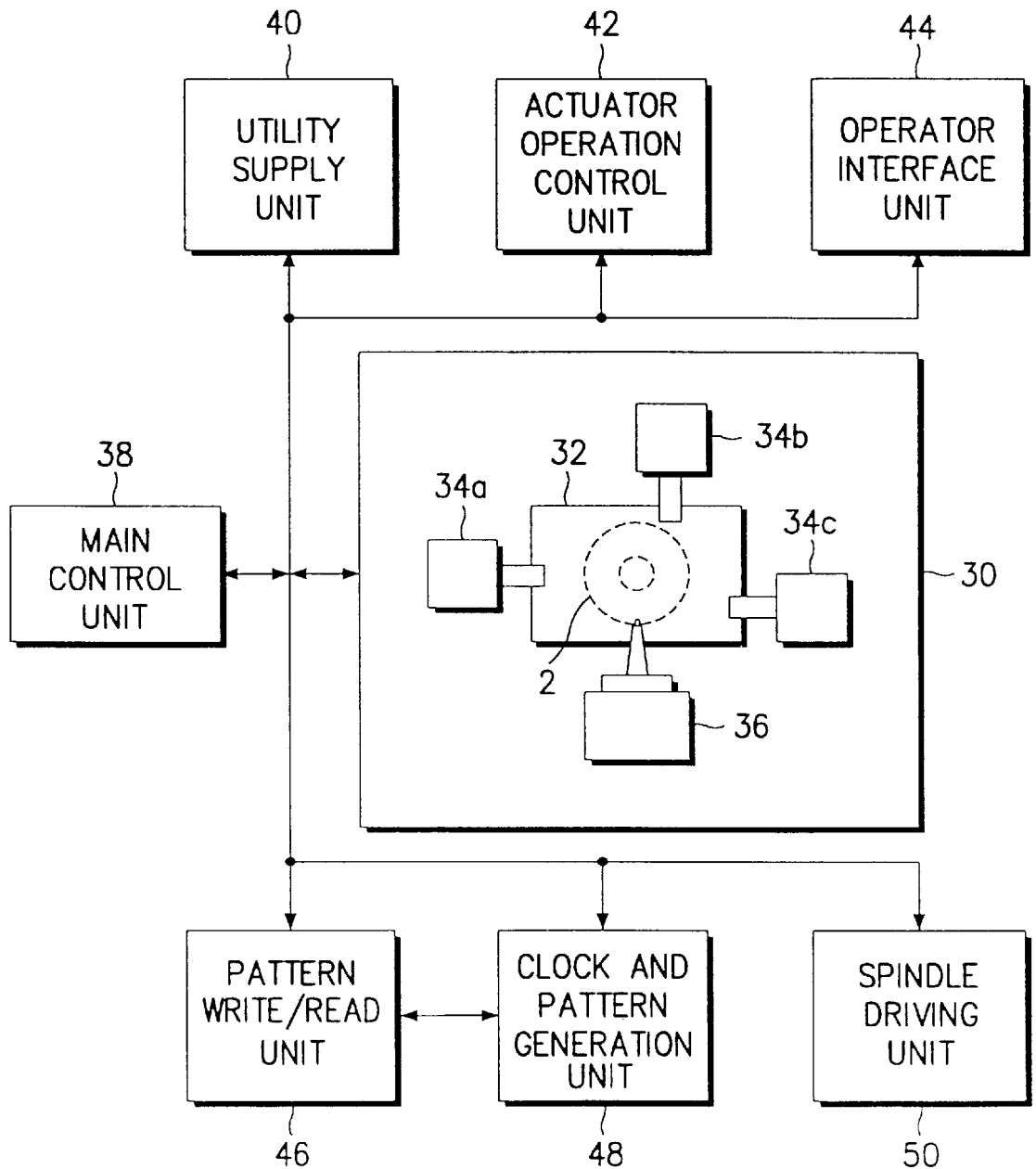
FIG. 4 is a block diagram of a general servo track writer for recording servo information on a disk.

FIG. 4 is a block diagram of a general servo track writer (STW) for recording servo information on the disk 2. Referring to FIG. 4, a fixture unit 30 has clamping units 34a, 34b, and 34c for clamping a head/drive assembly (HDA) 32, and a clock head unit 36 for writing a reference servo clock signal on the disk 2 by a clock head. The reference servo clock signal is written in a predetermined area, generally, an area outside the outermost servo track, of the disk 2, to determine a reference position on the disk 2 for servo information writing. Servo tracks indicate tracks formed on the disk surface by the STW. Meanwhile, the clock head is loaded at the reference servo clock position through a hole in a side surface of the HDA 32. T he side hole is normally sealed by a label. A main control unit 38 controls the entire portions of the STW. A utility supply unit 40 supplies operation power for the STW and air for the HDA 32. An actuator operation control unit 42 controls movement of an actuator. An operator interface unit 44 provides interface between an operator terminal and the main control unit 38 to allow the operator to control the operation of the STW or inform the operator of the operation of the STW. A pattern write/read unit 46 writes or reads a servo write pattern on or from a surface of the disk 2 by a head under the control of the main control unit 38. A clock and pattern generation unit 48 generates the reference servo clock signal and the servo write pattern under the control of the main control unit 38. A spindle driving unit 50 drives the spindle motor 22 (FIGS. 1–2) under the control of the main control unit 38.

Figures 5A, 5B:
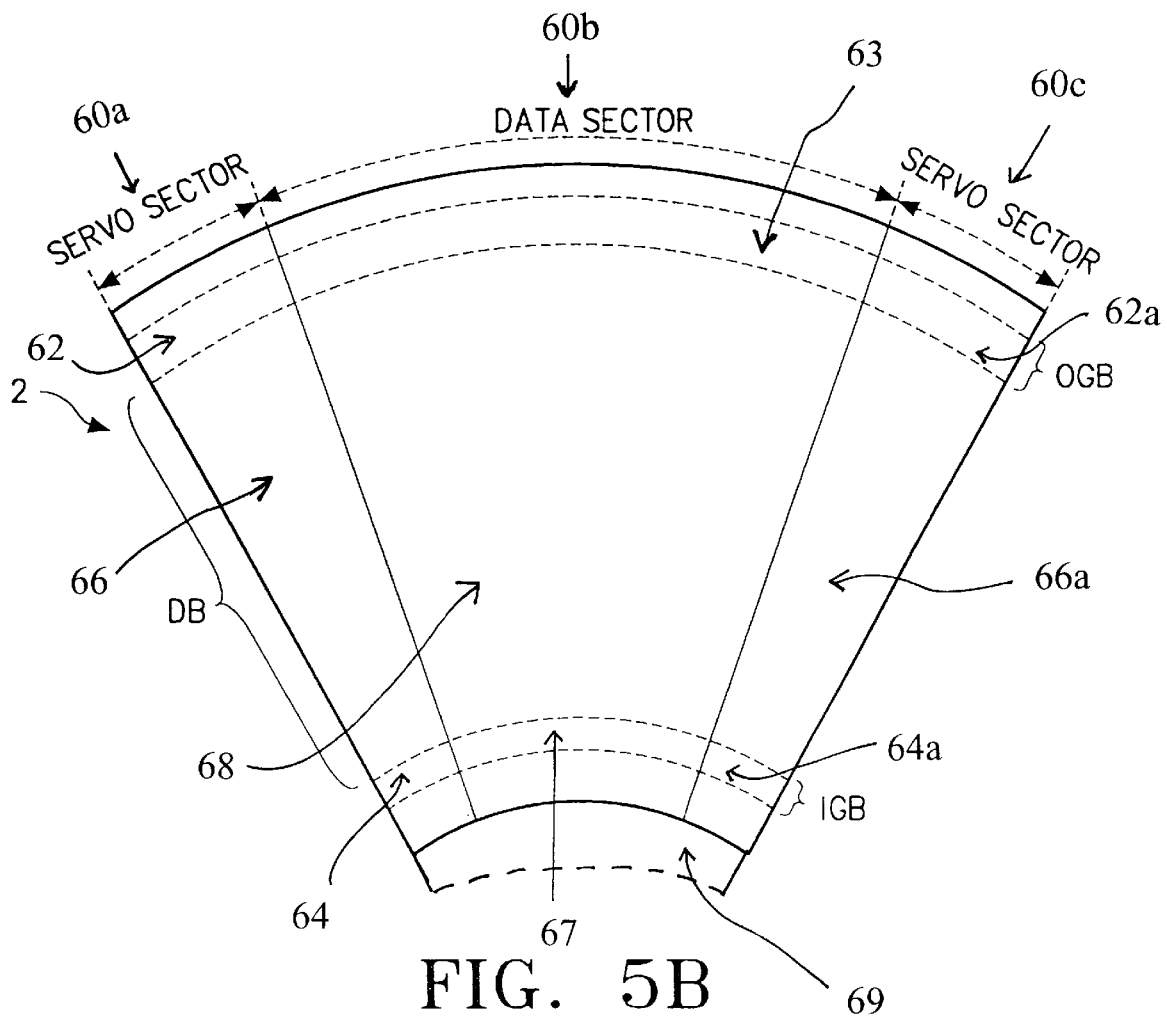
FIG. 5A illustrates a detailed format of a specific gray code, such as in an outer guard band and an inner guard band, in which the port number of a servo track writer is recorded in the present invention.
FIG. 5B is a partial plan view of a disk, illustrating a data band, guard bands, data sector, servo sector, and maintenance cylinder for use in the present invention.

FIG. 5A illustrates a detailed format of a specific gray code, such as in the outer guard or protection band OGB and the inner guard or protection band IGB, in which a servo track writer (STW) port number that has been provided identifying a servo track writer (STW) is recorded according to embodiments of the present invention. FIG. 5B is a partial plan view of the disk 2 illustrating servo sectors 60a and 60c and data sector 60b for use in the present invention. Referring to FIGS. 2–5B, a method for recording an STW port number according to the present invention will be described.

By servo track writing on the disk 2 by a servo track writer (STW) as shown in FIG. 4, the disk 2 is largely divided into three bands, that is, the outer guard or protection band OGB, the data band DB, and the inner guard or protection band IGB, as shown in FIGS. 2 and FIG. 5B. Only the data band DB is used to record user data, while the other bands, that is, the outer guard or protection band OGB and the inner guard or protection band IGB are formed to provide a margin for heat-caused deformation of a drive, part tolerance, overshoot during a track search, and so forth.

The STW port number that has been provided identifying a servo track writer (STW) can be recorded in at least one of any of the three bands, such as the OGB, IGB or DB of disk 2 illustrated in FIG. 5B, during servo track writing according to the present invention. Preferably, the port number of the servo track writer (STW) is recorded in a servo sector of one of inner protection band IGB and outer protection band OGB, such as in areas 62, 62a, 64 and 64a of respective servo sectors 60a and 60c in FIG. 5B. The port number of the servo track writer (STW) can also desirably be recorded in a data sector of the data band of the disk 2, such as in data sector 60b in data band area 68 in FIG. 5B, or in a data sector of one of an inner protection band IGB and an outer protection band OGB such as in areas 63 or 67 of data sector 60b in FIG. 5B. However, in case the STW port number is recorded in a data sector of the data band DB, such as in data sector 60b in data band area 68 shown in FIG. 5B, it preferably should be re-recorded in a maintenance cylinder, such as maintenance cylinder 69 in FIG. 5B, before data writing, since it is likely to be erased by the data writing in a burn-in process.

Therefore, in an embodiment of the present invention, the STW port number is recorded in a gray code of a servo sector in the outer guard or protection band OGB or the inner guard or protection band IGB, as shown in FIG. 5A, such as in one of servo sectors 60a, 60c in one of areas 62, 62a, 64, 64a in FIG. 5B, for example. Generally, only the STW port number and a cylinder number are recorded in the gray code. Though the gray code generally has a sector number, a head number, and a cylinder number as shown in FIG. 3C, information such as the sector and head numbers is generally unnecessary in gray codes of the OGB and IGB which are free of user data. Thus, ideally, the STW port number is recorded in the gray code of a servo sector in the outer guard or protection band OGB or the inner guard or protection band IGB. Though not usually preferable, the STW port number can be recorded in a servo sector of the data band DB, such as in one of data band areas 66, 66a in a respective servo sector 60a,60c, shown in FIG. 5B in another embodiment of the present invention, since the STW port number is seldom used for operation of the drive.

Meanwhile, the STW port number recorded in the gray code of a servo sector in the outer guard or protection band OGB or the inner guard or protection band IGB by the STW is accessed by a vendor unique command, and decoded, so as to be used as process automation information during a manufacturing process of a hard disk drive. In addition, in case the port number is recorded in the data band DB, a first accessed port number can be re-recorded in a maintenance cylinder of the disk before data writing.

As described above, the recorded port numbers of servo track writers (STWs) provide information on serial numbers and pass/fail of drives tested in each manufacturing process, for process automation, and facilitate detection, repair, and maintenance of defective STWs in a failure analysis, in the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A servo track writer port number recording method, comprising the steps of:
    providing a port number for a servo track writer; and
    recording the port number of the servo track writer in a predetermined area of a recording medium of a magnetic storage device during servo information writing.

2. The servo track writer port number recording method as claimed in claim 1, further comprising the steps of:
    reading the port number recorded in the recording step from the recording medium; and
    analyzing an efficiency of a manufacturing process of the magnetic storage device using the port number recorded.

3. The servo track writer port number recording method as claimed in claim 2, wherein the predetermined area of the recording medium is located in a servo sector of the recording medium.

4. The servo track writer port number recording method as claimed in claim 2, wherein the predetermined area of the recording medium is located in a data sector of the recording medium.

5. The servo track writer port number recording method as claimed in claim 1, wherein the predetermined area of the recording medium is located in a servo sector of the recording medium.

6. The servo track writer port number recording method as claimed in claim 1, wherein the predetermined area of the recording medium is located in a data sector of the recording medium.

7. A servo track writer port number recording method, comprising the steps of:
    providing a port number for a servo track writer; and
    recording the port number of the servo track writer in at least one of a plurality of bands of a disk of a hard disk drive during servo information writing, the plurality of bands including a data band for recording user data and at least one protection band.

8. The servo track writer port number recording method as claimed in claim 7, wherein the port number of the servo track writer is recorded in a servo sector in at least one protection band, the at least one protection band including at least one of an inner protection band and an outer protection band.

9. The servo track writer port number recording method as claimed in claim 8, wherein the port number of the servo track writer is recorded in a gray code in a servo sector of the disk.

10. The servo track writer port number recording method as claimed in claim 7, wherein the port number of the servo track writer is recorded in a servo sector in the data band of the disk.

11. The servo track writer port number recording method as claimed in claim 7, wherein the port number of the servo track writer is recorded in a data sector in the data band of the disk.

12. The servo track writer port number recording method as claimed in claim 11, further comprising the steps of:
   reading the port number of the servo track writer from the data band; and
   re-recording the port number of the servo track writer in a maintenance cylinder of the disk, before data writing.

13. The servo track writer port number recording method as claimed in claim 7, wherein the port number of the servo track writer is recorded in a data sector in at least one protection band of the disk, the at least one protection band including at least one of an inner protection band and an outer protection band.

14. The servo track writer port number recording method as claimed in claim 7, further comprising the steps of:
   reading the port number recorded in the recording step from the recording medium; and
   analyzing an efficiency of a manufacturing process of the hard disk drive using the port number recorded.

15. The servo track writer port number recording method as claimed in claim 14, wherein the port number of the servo track writer is recorded in a servo sector in at least one protection band of the disk, the at least one protection band including at least one of an inner protection band and an outer protection band.

16. The servo track writer port number recording method as claimed in claim 15, wherein the port number of the servo track writer is recorded in a gray code in a servo sector of the disk.

17. The servo track writer port number recording method as claimed in claim 14, wherein the port number of the servo track writer is recorded in a servo sector in the data band of the disk.

18. The servo track writer port number recording method as claimed in claim 14, wherein the port number is the servo track writer is recorded in a data sector in the data band of the disk.

19. The servo track writer port number recording method as claimed in claim 18, further comprising the steps of:
   reading the port number of the servo track writer from the data band; and
   re-recording the port number of the servo track writer in a maintenance cylinder of the disk, before data writing.

20. The servo track writer port number recording method as claimed in claim 14, wherein the port number of the servo track writer is recorded in a data sector of at least one protection band in the disk, the at least one protection band including at least one of an inner protection band and an outer protection band.

21. A servo track writer port number recording method for use in a manufacturing process of a magnetic storage device, comprising the steps of:
   recording a port number of a servo track writer in a predetermined area of a recording medium during servo information writing;
   reading the port number recorded in the recording step from the recording medium; and
   analyzing an efficiency of a manufacturing process for the magnetic storage device using the port number recorded.

22. A servo track writer port number recording method for use in a manufacturing process of hard disk drive having a disk as a recording medium, the disk including a plurality of bands, the plurality of bands including a data band for recording user data and a plurality of protection bands, the method comprising the steps of:
   recording a port number of a servo track writer in at least one of the plurality of bands of the disk during servo information writing;
   reading the port number recorded in the recording step from the recording medium; and
   analyzing an efficiency of a manufacturing process for the hard disk drive using the port number recorded.

* * * * *